(12) United States Patent
Strachan

(10) Patent No.: US 10,294,745 B2
(45) Date of Patent: May 21, 2019

(54) REACTION VALVE DRILLING JAR SYSTEM

(71) Applicant: Halliburton Energy Services, Inc., Houston, TX (US)

(72) Inventor: Michael J. Strachan, Conroe, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 204 days.

(21) Appl. No.: 15/123,211

(22) PCT Filed: Apr. 18, 2014

(86) PCT No.: PCT/US2014/034699
§ 371 (c)(1),
(2) Date: Sep. 1, 2016

(87) PCT Pub. No.: WO2015/160365
PCT Pub. Date: Oct. 22, 2015

(65) Prior Publication Data
US 2017/0067306 A1 Mar. 9, 2017

(51) Int. Cl.
*E21B 31/113* (2006.01)
*E21B 31/107* (2006.01)
(Continued)

(52) U.S. Cl.
CPC .......... *E21B 31/1135* (2013.01); *E21B 21/10* (2013.01); *E21B 31/107* (2013.01);
(Continued)

(58) Field of Classification Search
CPC ........ E21B 4/14; E21B 31/113; E21B 31/107; E21B 7/24; E21B 31/005; E21B 21/10; E21B 10/36; E21B 31/1135
See application file for complete search history.

(56) References Cited

U.S. PATENT DOCUMENTS 2,738,956 A * 3/1956 Bielstein .................. E21B 4/14
173/121
2,894,724 A * 7/1959 Andrew ................ E21B 31/113
166/177.6
(Continued)

FOREIGN PATENT DOCUMENTS

CN 1221468 A 6/1999
CN 102498261 A 6/2012
(Continued)

OTHER PUBLICATIONS

Canadian Intellectual Property Office, Examination Report, dated Nov. 2, 2017, 4 pages, Canada.
(Continued)

*Primary Examiner* — Kipp C Wallace

(57) ABSTRACT

An apparatus and method for drilling is disclosed, including a drill string with at least one jar and one reaction valve. Drilling fluid flows through the reaction valve. The reaction valve is selectively throttled, which creates a differential pressure across the valve seat. The differential pressure creates an axial force that is transferred to the jar, which aids in cocking or firing the jar. In an embodiment, a reaction valve throttles downward fluid flow to create a downward compressional force on the jar, while in another embodiment, a reaction valve throttles upward fluid flow to create an upward tensile force on the jar. Upward and downward fluid flow may be alternatively throttled for alternately firing the jar upwards and downwards. A bypass valve may be included in the drill string for establishing a drilling fluid flow path when such may be otherwise obstructed by foreign matter in the wellbore.

16 Claims, 8 Drawing Sheets

(51) Int. Cl.
  *E21B 21/10* (2006.01)
  *E21B 34/06* (2006.01)
  *F16K 3/08* (2006.01)
  *F16K 31/04* (2006.01)
(52) U.S. Cl.
  CPC .......... *E21B 31/113* (2013.01); *E21B 34/066* (2013.01); *F16K 3/085* (2013.01); *F16K 31/041* (2013.01)

(56) References Cited

U.S. PATENT DOCUMENTS

| | | | |
|---|---|---|---|
| 3,970,152 A * | 7/1976 | Harris | E21B 4/14 173/15 |
| 3,987,858 A | 10/1976 | Slator et al. | |
| 4,462,471 A * | 7/1984 | Hipp | E21B 31/113 175/296 |
| 4,550,789 A | 11/1985 | Crow | |
| 4,807,709 A | 2/1989 | Falgout, Sr. et al. | |
| 5,086,853 A | 2/1992 | Evans | |
| 5,318,139 A | 6/1994 | Evans | |
| 6,752,222 B2 * | 6/2004 | Karasawa | E21B 4/003 173/78 |
| 7,163,058 B2 | 1/2007 | Bakke | |
| 8,051,926 B2 * | 11/2011 | Weddfelt | E21B 1/02 173/206 |
| 8,695,696 B2 | 4/2014 | Shoyhetman et al. | |
| 8,851,175 B2 * | 10/2014 | Onadeko | E21B 17/06 166/301 |
| 2007/0221412 A1 * | 9/2007 | Hall | E21B 4/14 175/107 |
| 2009/0223676 A1 | 9/2009 | Eddison et al. | |
| 2010/0187017 A1 * | 7/2010 | Lyon | E21B 4/14 175/296 |
| 2010/0282509 A1 * | 11/2010 | Plunkett | E21B 4/14 175/26 |
| 2011/0297380 A1 * | 12/2011 | Alberty | E21B 31/113 166/301 |
| 2012/0085584 A1 | 4/2012 | Jiao et al. | |
| 2012/0186878 A1 * | 7/2012 | Eddison | E21B 4/14 175/57 |
| 2015/0376949 A1 * | 12/2015 | Vatne | E21B 4/14 173/136 |
| 2016/0273294 A1 * | 9/2016 | Moyes | E21B 31/107 |

FOREIGN PATENT DOCUMENTS

| | | |
|---|---|---|
| CN | 203296693 U | 11/2013 |
| CN | 203296732 U | 11/2013 |
| CN | 203296733 U | 11/2013 |
| RU | 2145659 C1 | 2/2000 |
| WO | WO-9746787 | 12/1997 |
| WO | WO-2011153180 A2 | 12/2011 |

OTHER PUBLICATIONS

Office Action issued for Russian Patent Application No. 201380079993.X dated May 31, 2017, 24 pages (with translation).

The State Intellectual Property Office of the People's Republic of China, First Office Action and Search Report, Application No. 201480077090.2, dated Mar. 5, 2018, 6 pages, China.

The State Intellectual Property Office of the People's Republic of China, First Office Action and Search Report, Application No. 201480077090.2, English Translation, dated Mar. 5, 2018, 14 pages, China.

Korean Intellectual Property Office, International Search Report and Written Opinion, dated Jan. 16, 2015, 15 pages, Korea.

\* cited by examiner

REACTION VALVE DRILLING JAR SYSTEM

This application is a U.S. national stage patent application of International Patent Application No. PCT/US2014/034699, filed on Apr. 18, 2014, the benefit of which is claimed and the disclosure of which is incorporated herein by reference in its entirety.

TECHNICAL FIELD

The present disclosure relates generally to oilfield equipment, and in particular to downhole tools, drilling systems, and drilling techniques for drilling wellbores in the earth. More particularly still, the present disclosure relates to an improvement in systems and methods for freeing stuck drill pipe.

BACKGROUND

During the drilling of an oil or gas wellbore or the like, situations are encountered wherein a component of the drill string becomes lodged in the wellbore. When the static force necessary to move a drill string exceeds the rig's capabilities or the tensile strength of the drill pipe, the drill string is stuck and can no longer be moved or rotated. A jar is a tool that is prepositioned within the drill string to free any portion of the drill sting which may become stuck.

BRIEF DESCRIPTION OF THE DRAWINGS

Embodiments are described in detail hereinafter with reference to the accompanying figures, in which.

DETAILED DESCRIPTION

Figure 1:
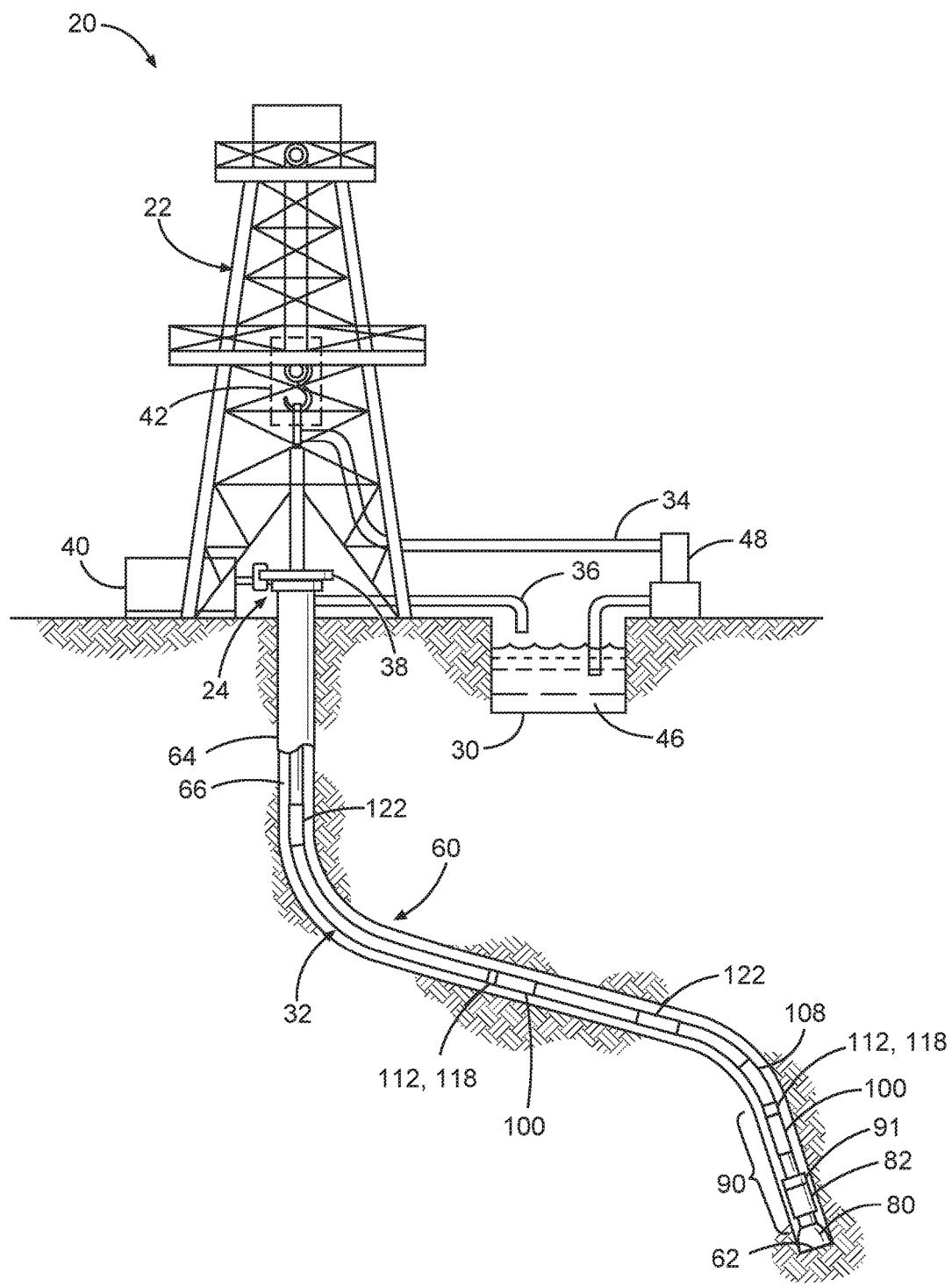
FIG. 1 is an elevation view in partial cross section of a drilling system that employs a drill string with drill pipe, a jar, an accelerator, and a reaction valve disposed between the drill pipe and the jar according to an embodiment.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

FIG. 1 is an elevation view in partial cross-section of a drilling system 20 including a bottom hole assembly 90 according to an embodiment. Drilling system 20 may include a drilling rig 22, such as the land drilling rig shown in FIG. 1. However, teachings of the present disclosure may be used in association with drilling rigs 22 deployed on offshore platforms, semi-submersibles, drill ships, or any other drilling system for forming a wellbore.

Drilling rig 22 may be located proximate to or spaced apart from well head 24. Drilling rig 22 may include rotary table 38, rotary drive motor 40 and other equipment associated with rotation of drill string 32 within wellbore 60. Annulus 66 is formed between the exterior of drill string 32 and the inside diameter of wellbore 60. For some applications drilling rig 22 may also include top drive motor or top drive unit 42. Blowout preventers (not expressly shown) and other equipment associated with drilling a wellbore may also be provided at well head 24.

The lower end of drill string 32 includes bottom hole assembly 90, which carries at a distal end a rotary drill bit 80. Drilling fluid 46 may be pumped from reservoir 30 by one or more mud pumps 48, through conduit 34, to the upper end of drill string 32 extending out of well head 24. The drilling fluid 46 then flows through the longitudinal interior 33 of drill string 32, through bottom hole assembly 90, and exits from nozzles formed in rotary drill bit 80. At bottom end 62 of wellbore 60, drilling fluid 46 may mix with formation cuttings and other downhole fluids and debris. The drilling fluid mixture then flows upwardly through annulus 66 to return formation cuttings and other downhole debris to the surface. Conduit 36 may return the fluid to reservoir 30, but various types of screens, filters and/or centrifuges (not expressly shown) may be provided to remove formation cuttings and other downhole debris prior to returning drilling fluid to reservoir 30. Various types of pipes, tube and/or hoses may be used to form conduits 34 and 36.

According to an embodiment, bottom hole assembly 90 includes a downhole mud motor 82, which may have a bent housing. Bottom hole assembly 90 may also include various other tools 91, such as those that provide logging or measurement data and other information from the bottom of wellbore 60. Measurement data and other information may be communicated from end 62 of wellbore 60 using measurement while drilling techniques and converted to electrical signals at the well surface to, among other things, monitor the performance of drilling string 32, bottom hole assembly 90, and associated rotary drill bit 80.

Drill string 32 includes a jar 100 for freeing stuck pipe. Jar 100 may be located in bottom hole assembly 90 or elsewhere along drill string 32. In some configurations, multiple jars 100 may be included in drill string 32. In the case of multiple jars 100, it is preferable that the jars 100 not be located in close proximity to one another as such configuration can impose excessive loads during jarring operations. A distance of 1500 feet is preferably maintained between multiple jars 100. One or more drill collars 108 may also be included in drill string 32, and in some configurations, drill collars 108 are positioned above jar 100. However, one or more sections of heavy weight drill pipe may be substituted for drill collars 108. Two predominant reasons why drilling pipe become stuck include mechanical sticking and differential sticking. Mechanical sticking is caused by a physical obstruction or restriction between a portion of the drill string and the wellbore wall, such as when an unconsolidated formation, earthen cuttings or other debris collect in the annulus between the drill string and the wellbore or when the shape or size of the wellbore and that of the drill string are incompatible. Other causes of interference may include an under-gauge hole, a stiff drill string, unstable formations, ledges, doglegs, and buckled casing. Differential sticking is caused when hydrostatic pressure in the drilling fluid column is greater than the pore pressure in the permeable formation, which forces the drill string into tight engagement with the wellbore wall.

Jar 100 is pre-positioned in drill string 32 to loosen any portion of drill string 32 which may become stuck. Jar 100 operates on the principle of stored potential energy. The potential energy available to jar 100 comes from over-pull (tensile) or set-down (compressive) forces applied to the drill pipe at the surface. Jarring is the process of dynamically transferring strain or compression energy stored in the drill string to the jar, which converts that energy into kinetic energy that is concentrated at the point where the pipe is stuck.

Jar 100 may include a mandrel, which slides within a sleeve, and a detent mechanism. The mandrel functions as a hammer, and the sleeve functions as an anvil. The detent mechanism, restricts the movement of the mandrel before freely releasing it (i.e., "firing"), so that sufficient potential energy accumulates within the drill string and is transferred to the mandrel to cause, upon firing, the mandrel to rapidly move and strike the sleeve.

Jar 100 may be a double acting jar that can provide jarring force both upwards and downwards. The separate functions of jarring upward or downward may be accomplished in any sequence; that is, up only, down only, or alternately up and down. Jar 100 may be run in drill string 32 either in tension, in which the mandrel is completely extended, or in compression, in which the mandrel is completely retracted. In either position, mandrel movement is prevented until jarring becomes necessary. If run under tension, the operator must first apply compression to drill string 32 in order to cock the mandrel into a position that allows upward firing. Conversely, if run under compression, the operator must first apply tension to drill string 32 in order to cock the mandrel for downward firing.

In operation, to fire jar 100 upwards, the operator applies over-pull tension at the top of drill string 32 while the lower end of drill string 32, which is stuck, remains stationary. The force of the upward pull is directly applied to the mandrel. However, because the detent in jar 100 restricts the upward movement of the mandrel during this loading phase, the drill pipe is physically stretched and stores strain energy.

After a predetermined time has elapsed or a predetermined force is reached, jar 100 fires: The detent mechanism trips, allowing the mandrel to freely and rapidly accelerate upwards under the tensile force applied to it by the stretched drill string 32. The drill pipe is thus set into motion, and because of the high mass of the drill collars 108 or heavy weight drill pipe included in drill string 32 just above jar 100, momentum is rapidly gained. At the end of its upward travel, the mandrel strikes the sleeve. This impact creates an impulse, and the kinetic energy of the moving drill string is transmitted as shock wave that travels up and down the drill string to free the stuck portion of the drill string. After firing, drill string 32 must be lowered until the drill string weight imposes a sufficient compressive force on jar 100 to reset the mandrel for another upward jarring cycle. Alternatively, jar 100 may be immediately fired in a downward direction.

To fire jar 100 downwards, instead of over-pull applied to the drill pipe, the weight of drill string 32 is at least partially released by rig 22, delivering a compressive set-down force to the mandrel. The detent in jar 100 restricts the downward movement of the mandrel during this loading phase. After a predetermined time has elapsed or a predetermined force is reached, jar 100 fires: The detent mechanism trips, allowing the mandrel to freely and rapidly accelerate downwards under the weight of the drill string. The drill pipe is thus set into motion, and because of the high mass of the drill collars 108 or heavy weight drill pipe typically included in the drill string just above jar 100, momentum is rapidly gained. At the end of its downward travel, the mandrel strikes the sleeve. This impact creates an impulse, and the kinetic energy of the moving drill string 32 is transmitted as a shock wave that travels along drill string 32 to free the stuck portion. After firing, drill string 32 must be raised until a sufficient tension resets the mandrel for another downward jarring cycle, or jar 100 may be immediately fired in an upward direction.

Jar 100 may generally be either of two types based on the detent mechanism: Mechanical and hydraulic. A mechanical jars is actuated using a series of springs, locks and rollers with release mechanisms. A mechanical jar fires upward at a preset tensile force and downward at a preset compressional force, which normally exceed the forces reached during drilling. Firing is independent of the time of the loading phase. A hydraulic jar, on the other hand, operates by moving a piston pulling through a fluid-filled hydraulic cylinder. Fluid passes from one side of the piston to the other through an orifice, triggering valve, or similar restriction which initially limits flow to create a time delay during the loading phase and then freely opens the flow path to trip the detent mechanism and fire the jar. In some hydraulic jars, the pressure piston must move a predetermined distance in order to bypass the restriction or open the triggering valve. The built-in delay is designed to allow the operator sufficient time to apply the desired tensile or compressive force to the drill string before the flow restriction is cleared or the triggering valve is opened. Therefore, varying the metering rate of the fluid through the restriction affects the magnitude of impact.

A reaction valve 112 is included in drill string 32 and may be located in bottom hole assembly 90 or elsewhere in drill string 32. In some configurations, reaction valve 112 is positioned above jar 100. Furthermore, multiple reaction valves 112 may be included in drill string 32, particularly when multiple jars 100 are included in drill string 32. Reaction valve 112 is described in greater detail below.

A bypass valve 118 may be included in drill string 32 and may be located in bottom hole assembly 90 or elsewhere in drill string 32. Bypass valve 118 may be collocated with reaction valve 112, and indeed it may be housed in a common sub with reaction valve 112. Additionally, multiple bypass valves 118 may be included in drill string 32, particularly in arrangements in which multiple reaction valves 112 are included in drill string 32. Bypass valve 118 is described in greater detail below.

An accelerator 122 may optionally be included in bottom hole assembly 90 or elsewhere in drill string 32. Accelerator 122 may be positioned above jar 100. Moreover, multiple accelerators 122 may be included in drill string 32, particularly in arrangements in which multiple jars 100 are included in drill string 32. Accelerator 122 is described in greater detail below.

Figure 2:
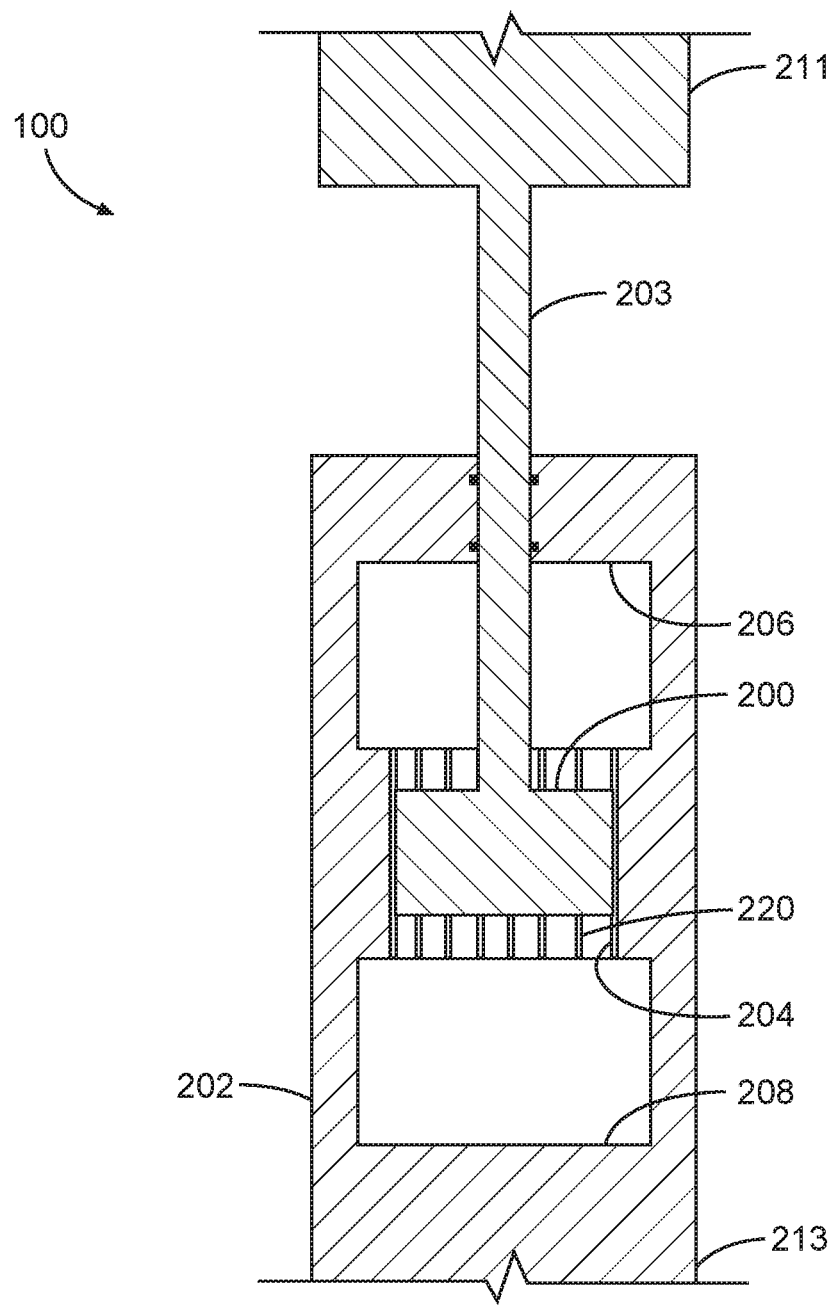
FIG. 2 is a simplified axial cross section of a jar of FIG. 1.

FIG. 2 is an axial cross section of the operable portion of a double-acting hydraulic jar 100 according to an embodiment, which is simplified for ease of illustrating the jar's operation. Referring to FIG. 2, jar 100 is arranged for connection within drill string 32 (FIG. 1). Although not illustrated, jar 100 may include a flow path for drilling fluid to pass through the tool. Jar 100 may include a mandrel 200 that slides within a sleeve 202. Sleeve 202 is filled with a fluid. Mandrel 200 functions both as a piston and as a double-headed hammer. The upper end 206 of sleeve 202 functions as an anvil for upward jarring, and the lower end 208 of sleeve 202 functions as an anvil for downward jarring. Mandrel 200 is connected by a connecting rod 203 to the upper end 211 of jar 100, and sleeve 202 is connected to the lower end 213 of jar 100.

A detent mechanism 204, which in the embodiment illustrated in FIG. 2 includes an inward projection shoulder that provides a fluid restriction in sleeve 202, operates to delay motion of mandrel 200 within sleeve 202 to provide a loading phase for buildup of over-pull tension or set-down compression within the drill string. Detent mechanism 204 creates a fluid restriction across mandrel 200 that slows the initial stroke of the mandrel 200. Near the end of both the upstroke and the downstroke, detent 204 no longer creates a fluid restriction; the piston moves from the restrictive area into a larger area, allowing the compressed fluid to flow freely around mandrel 200. The pressure across mandrel 200 equalizes, and mandrel 200 may freely accelerate under the potential energy accumulated within the drill string during the loading phase, rapidly strike upper sleeve end 206 or lower sleeve end 208, much as a hammer would strike an anvil. This striking action is commonly referred by routineers as firing the jar.

The time required for jar 100 to fire and the intensity with which jar 100 fires is a function of the magnitude of the applied tension or compression. Over-pull tension or set-down compression influences the flow rate of the fluid within sleeve 202 past mandrel 200 through the restriction created by detent 204. Although low applied force can fire the jar, greater over-pull tension or set-down compression produces quicker and more intense jar firing.

Mandrel 200 and sleeve 202 may have a spline or polygonal transverse cross sectional profile 220 that allows mandrel 200 to transfer drill string torque through jar 100 with minimal backlash and without affecting the magnitude or the time delay of the jarring operation.

Referring to FIGS. 1 and 2, two jarring parameters determine the ability to free stuck pipe: Impact force and impulse. Impact force is defined as the peak force caused by the striking of mandrel 200 against sleeve 202, while impulse is a measurement of the change of momentum due to the jarring. Both impact force and impulse are influenced primarily by the number of drill collars 108 above jar 100. Fewer drill collars 108 result in a higher impact force, and more drill collars 108 deliver a greater impulse. The impact force produced by jar 100 is limited by the over-pull tension or slack-off weight available. Over-pull tension may approach the yield strength of drill string 32, but the available slack-off weight may be much less than the total drill string weight due to buckling limitations. Maximum effect may be achieved by optimizing both the placement of jar 100 and the number of drill collars 108 within drill string 32.

Additionally, differential pressure between the interior 33 of drill string 32 and annulus 60 acts on the sealed cross-sectional area of mandrel 200, which may create a pump-open force that urges mandrel 200 to extend. During normal drilling, pump-open force has no effect on weight on bit. However, when jarring upward, pump-open force must be added to the over-pull tension to obtain actual tension at jar 100, and when jarring downward, pump-open force must be subtracted from the slack-off weight to obtain actual compression at jar 100. Accordingly, pump-open force may be harnessed to aid in upward jarring by increasing the mud pump rate, which increases pump-open force.

It may be the case that drill string 32 is too short to allow for effective jarring. That is, drill string 32 may be too short to allow adequate stretching during over-pull, or it may be too light to provide adequate set-down weight, particularly if heavy weight drill pipe is used in place of drill collars 108. Accelerator 122 may be included in drill string 32 to significantly amplify jar impact and impulse. Using accelerator 122 can effectively double the impact force of jar 100. Moreover, accelerator 122 may relieve stress due to jarring operations from surface equipment. Accelerator 122 may be used in all types of wellbores, although accelerator 122 may be particularly beneficial in high-angle and horizontal wellbores, plastic salt sections, and other areas with high probability of differential sticking.

Figure 3A:
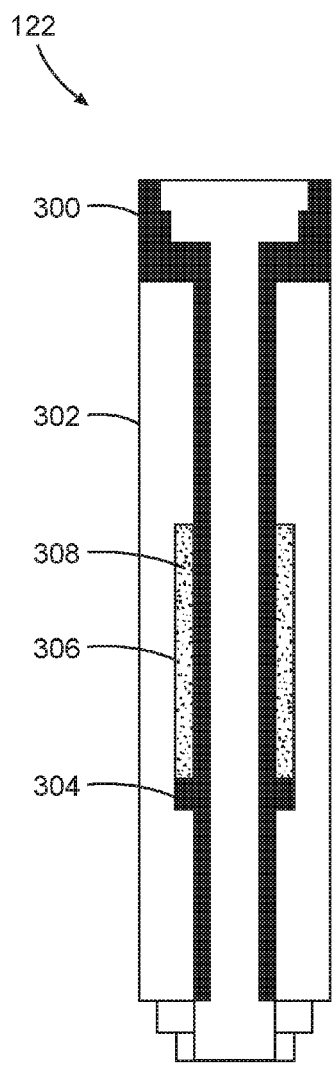
FIG. 3A is a simplified axial cross section of an accelerator of FIG. 1, shown in an unloaded state with no force applied.
Figure 3B:
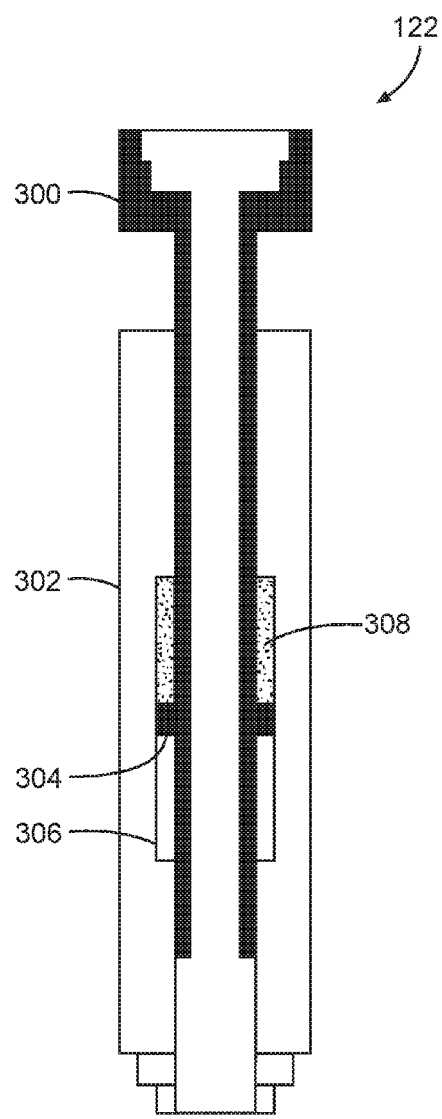
FIG. 3B is a simplified axial cross section of the accelerator of FIG. 3A, shown in a loaded state with force applied.

FIGS. 3A and 3B are axial cross sections of an accelerator 122 according to an embodiment. Accelerator 122 includes an inner mandrel 300 that is slidingly received within an outer barrel 302. Inner mandrel 300 includes a piston 304 that slides within a cylinder 306. Cylinder 306 is filled with a fluid 308, which may be a silicon fluid, for example. However, a spring may be used in place of fluid 308. In FIG. 3A, no load is applied to accelerator 122. When a tensile load is applied to accelerator 122, as shown in FIG. 3B, mandrel 300 and piston 304 are displaced within barrel 302 and cylinder 306, respectively, which compresses fluid 308 and stores potential energy.

When jar 100 fires, the stored potential energy in accelerator 122 is also released. The potential energy stored in and released from accelerator 122 accelerates the working mass of drill string 32 above jar 100 much more efficiently than does energy stored in a stretched drill string, because accelerator 122 eliminates the wellbore friction and drag generated over hundreds of meters of drill pipe.

Referring back to FIG. 1, reaction valve 112 is positioned above jar 110 and functions to increase a downward jar. Reaction valve 112 is positioned within the downward flow path of drilling fluid 46 through drill string 32. Reaction valve may be selectively throttled while drilling fluid is being circulated down through drill string 32 and up through annulus 66 of wellbore 60 by mud pumps 48. Throttling reaction valve 112 creates, in an isenthalpic process, a pressure drop across the seat of reaction valve 112. The differential pressure acts against the seat so that reaction valve 112 applies a downward throttling force that bears down on top of jar 100. The downward throttling force is proportional to the transverse cross sectional area of the seat, upon which the differential pressure acts. The downward throttling force is added to the set-down weight, and it may be employed to increase the intensity of downward jarring or to reset jar 100 for upward jarring. The downward throttling force can be varied by both varying the degree of throttling of reaction valve 112 and by increasing the output of mud pumps 48.

Figure 4:
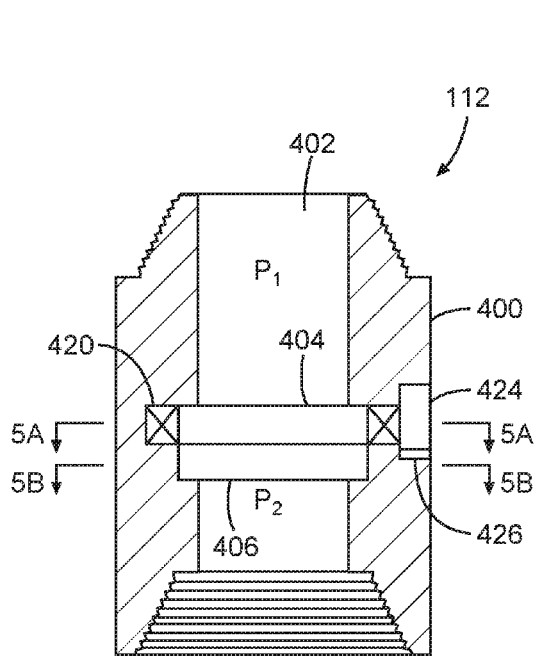
FIG. 4 is a simplified axial cross section of a reaction valve according to an embodiment, showing a rotor and stator that collectively define an adjustable valve seat for producing an axial reactive force in response to throttling of fluid flow therethrough.
Figure 5A:
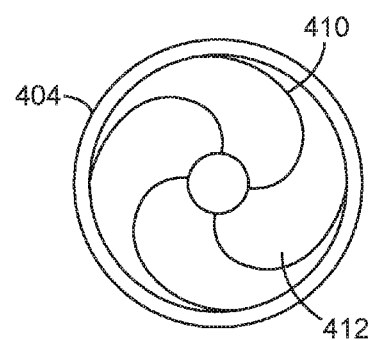
FIG. 5A is a simplified transverse cross section taken along line 5A-5A of FIG. 4, showing details of the rotor of the reaction valve of FIG. 4.
Figure 5B:
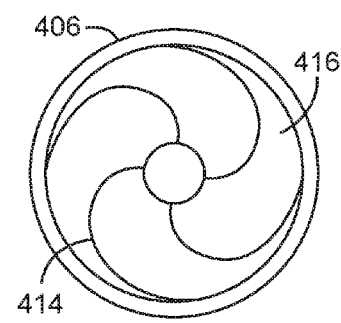
FIG. 5B is a simplified transverse cross section taken along line 5B-5B of FIG. 4, showing details of the stator of the reaction valve of FIG. 4.

FIG. 4 is an axial cross section of a reaction valve 112 according to an embodiment. FIGS. 5A and 5B are transverse cross sections of the rotor and stator, respectively, of reaction valve 112, which together form the seat of reaction valve 112. Referring to FIGS. 4-5B, reaction valve 112 includes a tubular body 400 which defines an axial flow path 402. The upper and lower ends of body 400 may include connectors for assembling reaction valve within drill string 32 or bottom hole assembly 90 (FIG. 1).

A valve seat is formed by a rotor 404 and a stator 406. Rotor 404 is characterized by having the shape of a ring with arcuate vanes 410 formed therein that define arcuate flow passages 412 therethrough. Stator 406 is substantially similar to rotor 404, having arcuate vanes 414 and flow passages 416. Stator 406 is fixed within body 402. Rotor 404 is rotatively received within body 402 and adjacent to stator 406. A drive mechanism 420 is operable to throttle reaction valve 112, i.e., to selectively rotatively position rotor 404 between a fully open position, in which flow passages 412 and 416 are aligned, and a shut position, in which vanes 410 substantially cover flow passages 16 so as to block fluid flow.

Due to throttling across rotor 404 and stator 406, the pressure $P_1$ upstream of rotor 404 is greater than the pressure $P_2$ downstream of stator 406. The seat area $A_S$ is the combined area of rotor vanes 410 and stator vanes 414 exposed to the flow stream, which is varied as rotor 404 is rotatively positioned. The throttling force $F_T$ is given as:

$$F_T = A_S(P_1 - P_2) \tag{Equation 1}$$

Drive mechanism 420 may be a solenoid winding, servo motor, or similar positioning device, and it may include a bearing assembly. A control system 424 controls drive mechanism 420. If desired, reaction valve 112 may be controlled from the surface via conventional telemetry. Reaction valve 112 may be programmed so that when it receives a throttle command, it throttles for a predetermined period and then opens again automatically. Reaction valve 112 may include one or more sensors 426, such as a transducer, an accelerometer, or an axial strain gauge, for measuring tension and compression. Sensor 426 allows reaction valve 112 to autonomously detect when upward and downward jarring has occurred. Reaction valve 112 may also be arranged to alternatively throttle shut and open automatically based on input from sensor 426 for repeated jarring and/or resetting. Although not illustrated, valve 112 may include a pressure-actuated bypass, which will actuate in the event valve 112 fails in the shut condition. In configurations in which multiple reaction valves 112 are included in drill string 32 (FIG. 1), each reaction valve 112 may be independently controlled from the surface via conventional telemetry.

Referring back to FIG. 1, it may occur in a mechanically stuck pipe situation that conventional drilling fluid circulation may be lost due to blockage of annulus 66. Without drilling fluid circulation, throttling reaction valve 112 would have little effect. Accordingly, bypass valve 118 may be positioned just below reaction valve 112 and used to bypass fluid flow from within drill string 32 to annulus 66, thereby allowing flow through reaction valve 112. Bypass valve 118 may be independently controlled from the surface via conventional telemetry, or it may be controlled by control system 424 of reaction valve 112, for example.

Figure 6:
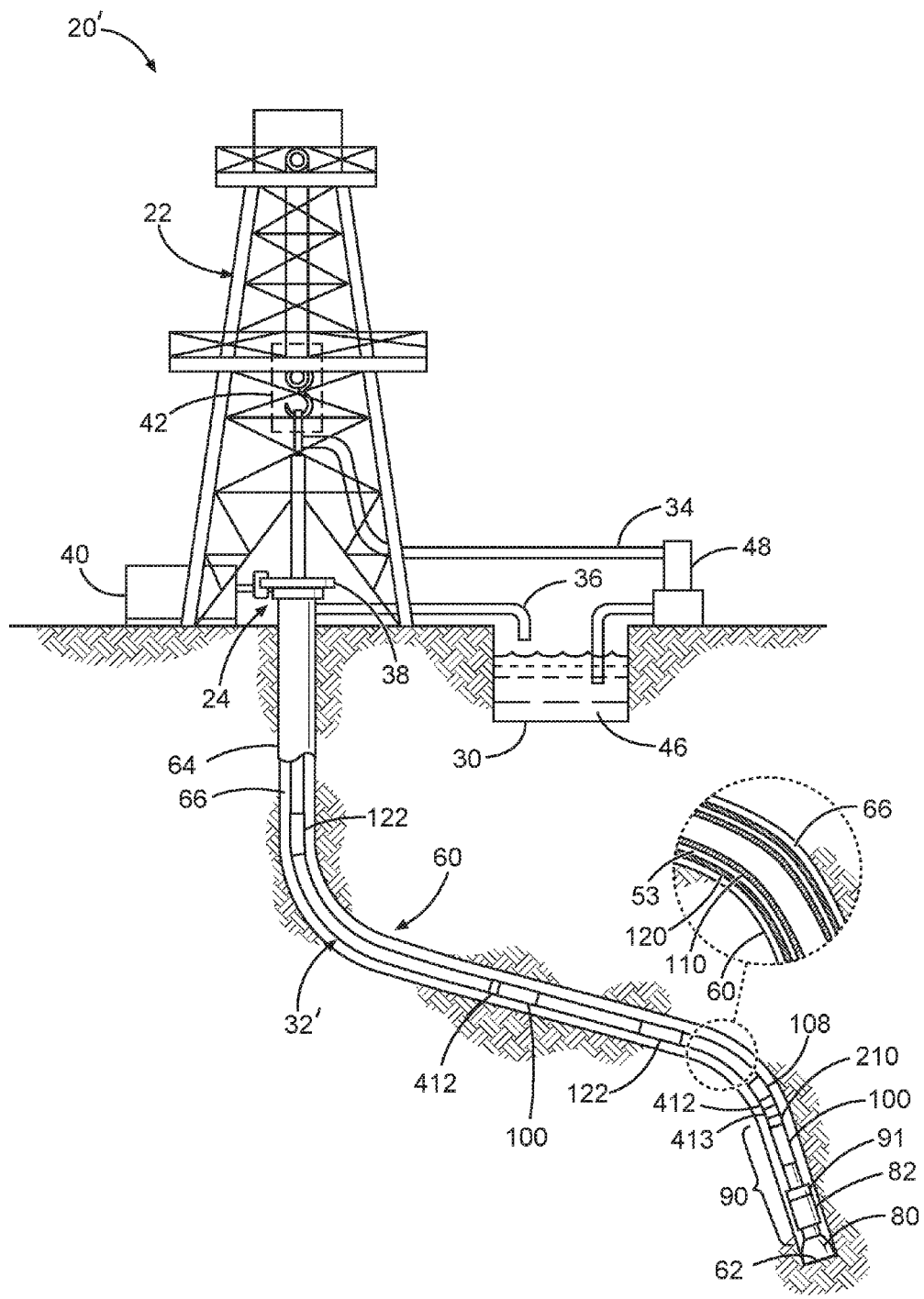
FIG. 6 is an elevation view in partial cross section of a drilling system that employs a pipe-in-pipe drill string, a jar, an accelerator, and a reaction valve disposed between the drill pipe and the jar according to an embodiment, with details of the pipe-in-pipe drill string shown in a blown up section for clarity.

FIG. 6 is an elevation view in partial cross-section of a drilling system 20' that includes a bottom hole assembly 90' according to an embodiment in which a Reelwell drilling method pipe-in-pipe drill string 32' is used in place of the conventional drill string 32 of FIG. 1. Drill string 32' includes an inner pipe 110 that is coaxially disposed within an outer pipe 120. Inner pipe 110 and outer pipe 120 may be eccentric or concentric. An annular flow path 53 is defined between inner pipe 110 and outer pipe 120, and an inner flow path 54 is defined within the interior of inner pipe 110. Moreover, annulus 66 is defined between the exterior of drill string 32' and the inside wall of wellbore 60. A flow diverter 210 located near the distal end of drill string 32' fluidly connects annulus 66 with inner flow path 54.

As with drilling system 20 of FIG. 1, drilling system 20' of FIG. 6 may include drilling rig 22 located on land, an offshore platform, semi-submersible, drill ship or the like. Drilling rig 22 may be located proximate well head 24 and may include rotary table 38, rotary drive motor 40 and other equipment associated with rotation of drill string 32' within wellbore 60. For some applications drilling rig 22 may include top drive motor or top drive unit 42. Blow out preventers (not expressly shown) and other equipment associated with drilling a wellbore may also be provided at well head 24.

The lower end of drill string 32' includes bottom hole assembly 90, which at a distal end carries a rotary drill bit 80. Drilling fluid 46 may be pumped from reservoir 30 by one or more drilling fluid pumps 48, through conduit 34, to the upper end of drill string 32' extending out of well head 24. The drilling fluid 46 then flows through the annular flow path 53 between inner pipe 110 and outer pipe 120, through bottom hole assembly 90', and exits from nozzles formed in rotary drill bit 80. At bottom end 62 of wellbore 60, drilling fluid 46 may mix with formation cuttings and other downhole fluids and debris. The drilling fluid mixture then flows upwardly through annulus 66, through flow diverter 210, and upwards through the inner flow path 54 provided by inner pipe 110 to return formation cuttings and other downhole debris to the surface. Conduit 36 may return the fluid to reservoir 30, but various types of screens, filters and/or centrifuges (not expressly shown) may be provided to remove formation cuttings and other downhole debris prior to returning drilling fluid to reservoir 30. Various types of pipes, tube and/or hoses may be used to form conduits 34 and 36.

Figure 7A:
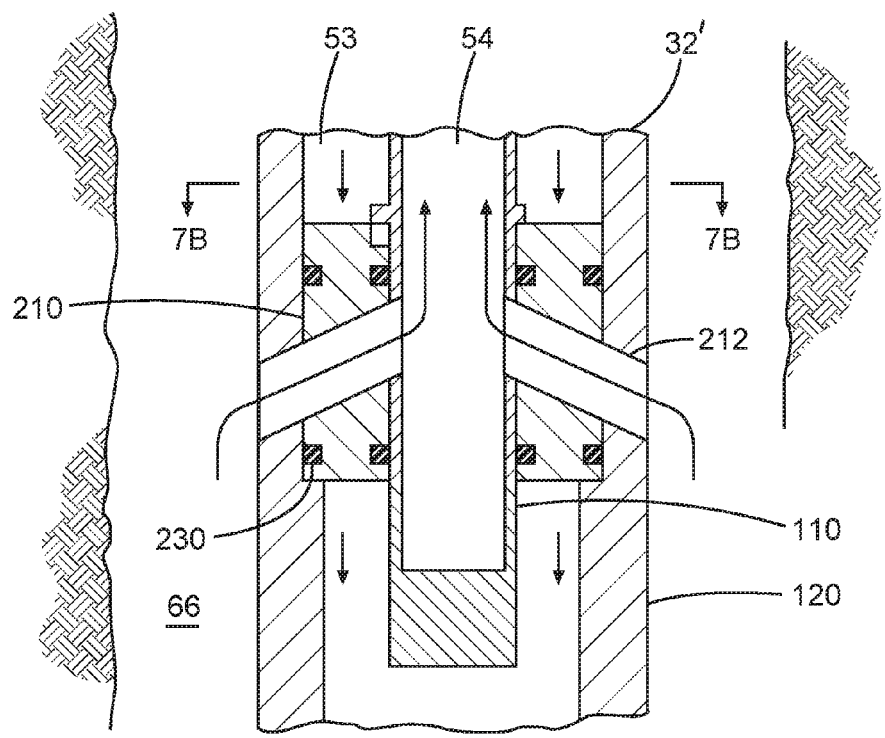
FIG. 7A is a simplified axial cross section of a flow diverter of FIG. 6, showing ports for cross-connecting a wellbore annulus with an inner pipe.
Figure 7B:
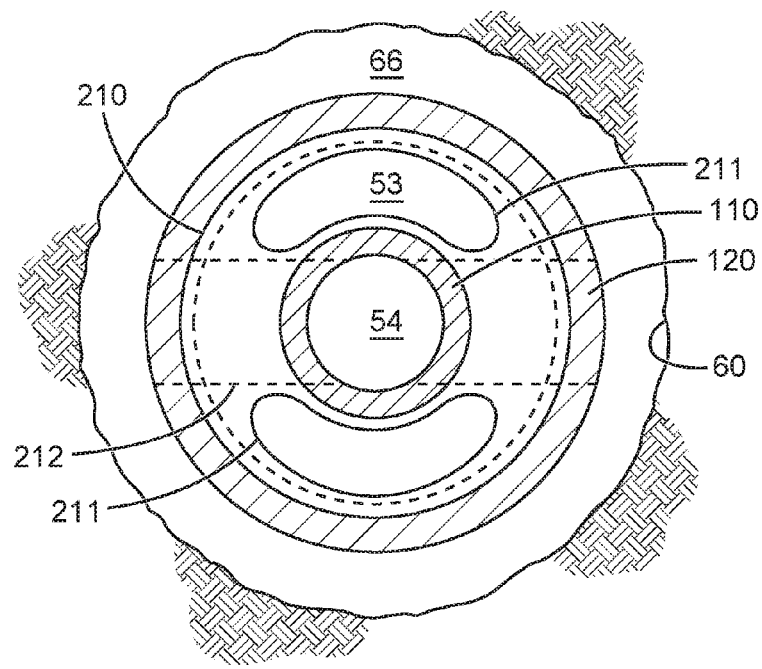
FIG. 7B is a simplified transverse cross section of the flow diverter of FIG. 7A, taken along line 7B-7B of FIG. 7A, showing ports for cross-connecting a wellbore annulus with an inner pipe.

FIGS. 7A and 7B are axial and transverse cross sections, respectively, of flow diverter 210. Referring to FIGS. 7A and 7B, flow diverter 210 is disposed between inner pipe 110 and outer pipe 120. Seals 320 may be located on the top and bottom of flow diverter 210 to prevent annular flow between inner pipe 110 and outer pipe 120 from leaking into the center of inner pipe 110. Flow diverter 210 may be keyed to inner pipe 110 and outer pipe 120 so as to maintain proper rotational alignment. During operation, drilling fluid 46 (FIG. 36) flows down annular flow path 53 between inner pipe 110 and outer pipe 120 and through kidney-shaped passages 211 within flow diverter 210. Concurrently, drilling fluid and earthen cuttings from annulus 66 formed between wellbore 60 and outer pipe 120 enters inner pipe 110 via crossover ports 212. Inner pipe 110 is capped or plugged at or just below flow diverter 210 so that fluid from annulus 66 can only flow upwards within inner pipe 110.

Figure 8A:
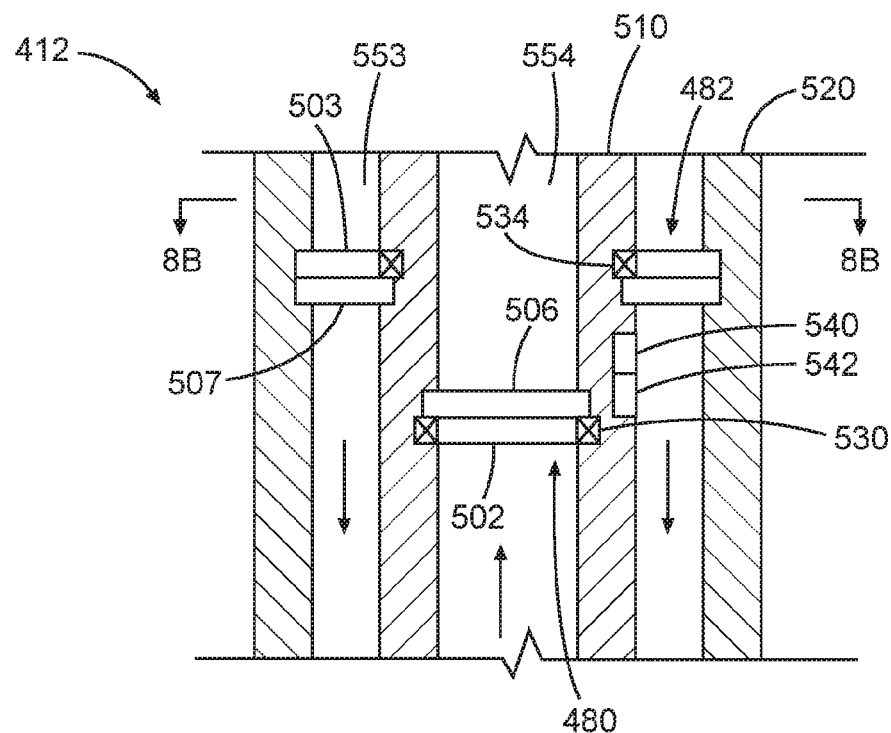
FIG. 8A is a simplified axial cross section of a dual upflow/downflow reaction valve according to an embodiment for use with the pipe-in-pipe drilling system of FIG. 6, showing an inner rotor and stator assembly for throttling up-flow and an annular rotor and stator assembly for throttling downflow.
Figure 8B:
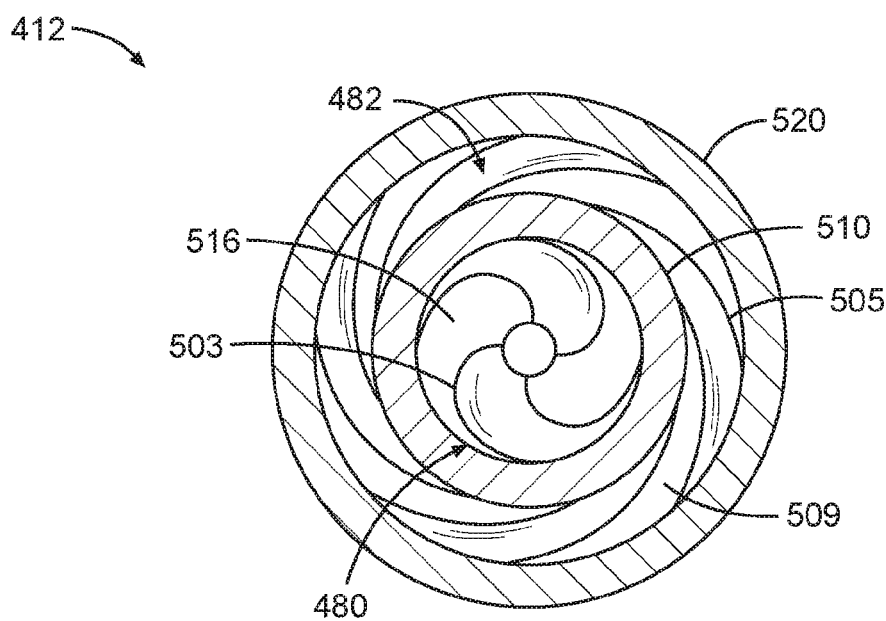
FIG. 8B is a simplified transverse cross section of the dual reaction valve of FIG. 8A taken along line 8B-8B of FIG. 8A.

FIGS. 8A and 8B are axial and transverse cross sections, respectively, of a dual reaction valve assembly 412 according to an embodiment, which may be suitable for use with the pipe-pip-pipe drilling system 20' of FIG. 6. Referring to FIGS. 6, 8A, and 8B, reaction valve 412 includes an inner tubular member 510 coaxially disposed within an outer tubular member 520. Inner tubular member 510 and outer tubular member 520 are arranged for coupling to inner pipe 110 and outer pipe 120, respectively, of drill string 32', so that the interior 554 of inner tubular member 510 is in fluid communication with inner flow path 54 and the annular region 553 outside of inner tubular member 510 and inside of outer tubular member 520 is in fluid communication with annular flow path 53. Dual reaction valve assembly 412 is located above flow diverter 210 so that drilling fluid flow downward in annular region 553, and drilling fluid, earthen cuttings and reservoir fluid flow upward through interior 554 of inner tubular member 510.

Dual reaction valve assembly 412 includes an upflow reaction valve 480 located within interior 554 and a downflow reaction valve 482 located within annular region 553. The upflow and downflow reaction valves 480, 482 may be operable independently of one another.

The upflow reaction valve 480 has valve seat formed by a rotor 502 and a stator 506. Rotor 502 is characterized by having the shape of a ring with arcuate vanes formed therein that define arcuate flow passages therethrough. Stator 506 is substantially similar to rotor 404, having arcuate vanes 503 and flow passages 516. Stator 506 is fixed within inner tubular member 510. Rotor 504 is rotatively received within inner tubular member 510 and adjacent to stator 506. A drive mechanism 530 is operable to selectively rotatively position rotor 502 between a fully open position, in which the flow passages are aligned, and a shut position, in which the rotor vanes substantially cover flow passages 516 so as to block upward fluid flow.

Similarly, the downflow reaction valve 482 has valve seat formed by a rotor 503 and a stator 507. Rotor 503 is characterized by having the shape of an annular ring with arcuate vanes 505 formed therein that define arcuate flow passages 509 therethrough. Stator 507 is substantially similar to rotor 503, having arcuate vanes and flow passages. Stator 507 is fixed between inner tubular member 510 and outer tubular member 520. Rotor 503 is rotatively received between inner tubular member 510 and outer tubular member 52 adjacent to stator 507 A drive mechanism 534 is operable to selectively rotatively position rotor 503 between a fully open position, in which the flow passages are aligned, and a shut position, in which rotor vanes 505 substantially cover the stator flow passages so as to block downward fluid flow.

Drive mechanisms 530 and 534 may include solenoid windings, servo motors, or similar positioning devices. A control system 540 controls drive mechanism 530 and 534. In one arrangement, dual reaction valve assembly 412 may be controlled from the surface via conventional telemetry. Dual reaction valve assembly 412 may be programmed so that when it receives a throttle command, it throttles for a predetermined period and then opens again automatically. However, dual reaction valve assembly 412 may also include one or more sensors 542, such as a transducer, an accelerometer, or an axial strain gauge, for measuring tension and compression. Such sensor 542 may allow dual reaction valve assembly 412 to autonomously detect when upward and downward jarring has occurred. Dual reaction valve assembly 412 may therefore also be arranged to alternatively throttle and open upflow and downflow reaction valves 480, 482 automatically based on input from sensor 542 for repeated jarring and/or resetting. In configurations in which multiple dual reaction valve assemblies 412 are included in drill string 32, each dual reaction valve assembly 412 may be independently controlled from the surface via conventional telemetry.

It may occur in a mechanically stuck pipe situation that conventional drilling fluid circulation may be lost due to blockage of annulus 66. Without drilling fluid circulation, throttling upflow and/or downflow reaction valves 480, 482 would have little effect. Accordingly, a bypass valve 413 may be positioned just below the lowest dual reaction valve assembly 412 in drill string 32'. Bypass valve 413 may be used to bypass fluid flow from annular flow path 53 to inner flow path 54, thereby allowing upflow and downflow through all dual reaction valve assemblies 412. Bypass valve 413 may be independently controlled from the surface via conventional telemetry, or bypass valve 413 may be controlled by control system 540 of dual reaction valve assembly 412, for example.

While circulating drilling fluid, downflow reaction valve 482 may be opened and upflow reaction valve 480 throttled to create a pressure differential across upflow reaction valve 480 that creates an upward tension force at dual reaction valve assembly 412. Such upward tension force may be used in lieu of or in addition to a surface-applied over-pull to cock or upward fire jar 100. Similarly, upflow reaction valve 480 may be opened and downflow reaction valve 482 throttled to create a pressure differential across downflow reaction valve 482 that creates a downward compression force at dual reaction valve assembly 412. Such downward compression force may be used in lieu of or in addition to a surface-applied slack-off to cock or downward fire jar 100. Such apparatus therefore provides enhanced jarring effect and quicker and more effective re-latching of jar 100.

Although drilling systems 20, 20' have been described herein as using a drilling fluid 46 such as a liquid drilling mud, the systems may also be used with air or gas. Because of the ability of gases to expand, such a system may provide a greater jarring enhancement.

Figure 9:
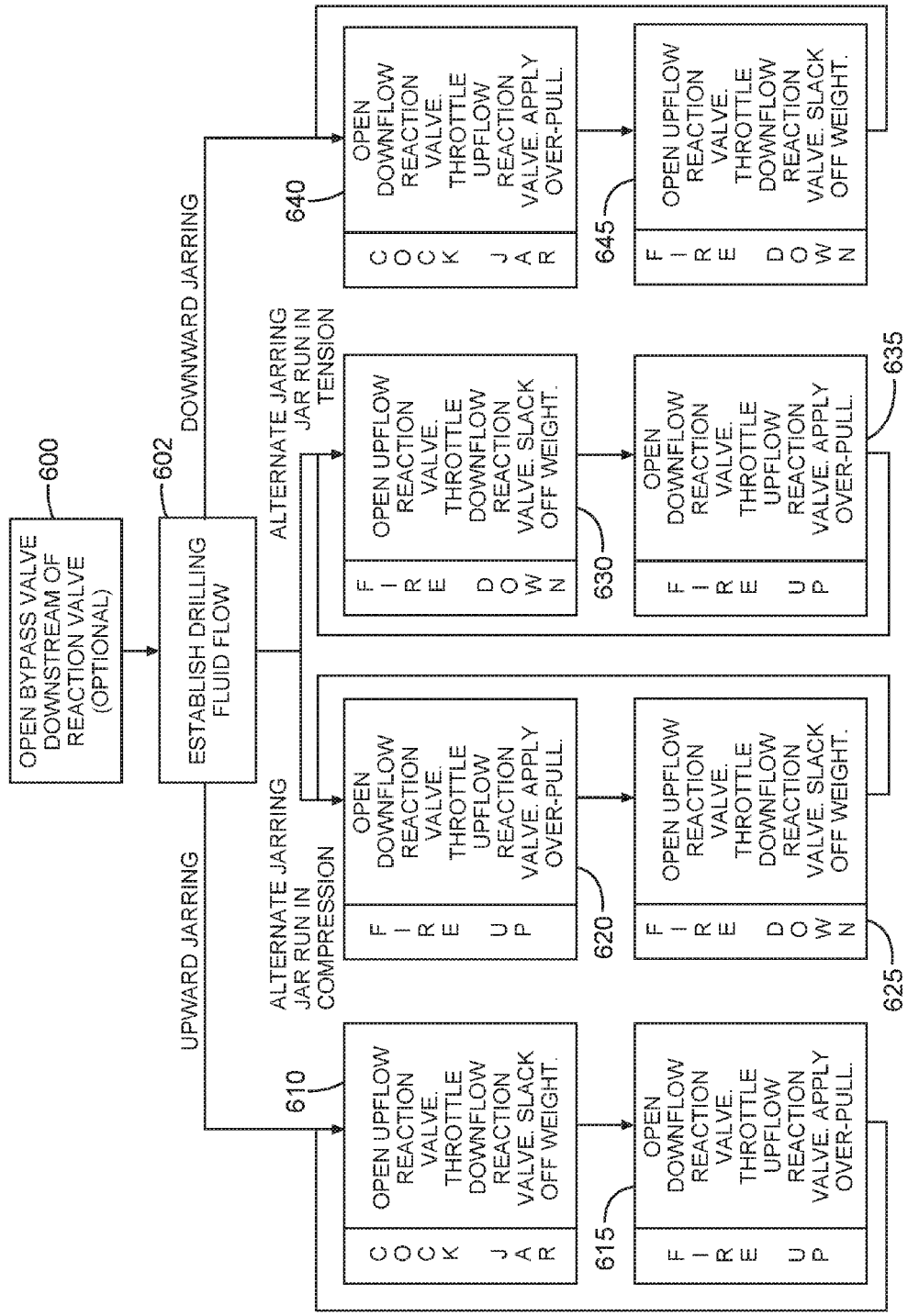
FIG. 9 is a flow chart of a method for drilling a wellbore according to an embodiment, demonstrating use of the drilling system of FIGS. 1-8B for increasing effectiveness of jarring operations.

FIG. 9 is a flow chart of a method for enhancing jarring effectiveness according to an embodiment, using exemplar drilling system 20' of FIG. 6, which includes drill string 32' that has pipe-in-pipe drill pipe, jar 100, and dual reaction valve assembly 412 disposed between the drill pipe and jar 100. Jar includes mandrel 200 that is slidingly received within sleeve 202, as described above with respect to FIG. 2. Referring to FIGS. 2, 6 and 9, if necessary to establish drilling fluid flow at a sufficient flow rate, at step 600 bypass valve 413 is opened to connect annular flow path 53 with inner flow path 54. At step 602, drilling fluid pumps 48 are energized to circulate drilling fluid 46 through drill string 32'.

Next, as shown in any of steps 610, 620, 630, and 640, drilling fluid is selectively throttled by a reaction valve so as to create a differential pressure across the reaction valve. The differential pressure creates an axial force that is transferred to jar 100, which urges mandrel 200 to move with respect to sleeve 202. For example, by throttling downflow reaction valve 482, mandrel 200 may be urged downward to cock jar 100 for subsequent upward firing as shown in step 610 or to fire jar 100 downward if jar 100 is run in tension as shown in step 630. Alternatively, upflow reaction valve 480 may be throttled to urge mandrel 200 upward to cock jar 100 for subsequent downward firing as shown in step 640 or to fire jar 100 upward if jar 100 is run in compression as shown in step 620.

For upward jarring, after cocking jar 100 in step 610, in step 615, downflow reaction valve 482 is opened, and upflow reaction valve 480 is throttled for firing jar 100 upwards. If necessary or desire, surface over-pull tension is applied. This process of throttling downflow reaction valve 482 for cocking jar 100 and then throttling upflow reaction valve 480 for firing jar 100 may then be repeated as often as necessary.

Likewise for downward jarring, after cocking jar 100 in step 640, in step 645, upflow reaction valve 480 is opened, and downflow reaction valve 482 is throttled for firing jar 100 downwards. If necessary or desire, the drill string tension is slacked at the surface to apply additional compressional force on jar 100. This process of throttling upflow reaction valve 480 for cocking jar 100 and then throttling downflow reaction valve 482 for firing jar 100 may then be repeated as often as necessary.

Drilling system 20' may also be used to alternatively fire jar 100 upwards and downwards. If jar 100 is initially run in hole under compression, then jar 100 is initially cocked for upward firing. Accordingly, in step 620, downflow reaction valve 482 is opened and upflow reaction valve 480 is throttled to apply a tension force on jar 100. As necessary, an over-pull tension may be applied at the surface. Once jar 100 fires in an upward direction, in step 625 upflow reaction valve 480 is opened and downflow reaction valve 482 is throttled to apply a compression force on jar 100. As necessary, an drill string tension may be slacked at the surface to apply additional compressional load on jar 100. After downward firing, the process is repeated. If jar 100 is initially run in hole under tension, process for alternate downward and upward firing is essentially the same as shown in steps 630 and 635, except that jar 100 is first fired in the downward direction.

In summary, a drilling system, an assembly for connection to a drill pipe, and a method of drilling a wellbore have been described. Embodiments of the drilling system may generally have: A drill string disposed in a wellbore forming a conduit for a flow of drilling fluid, the drill string including a drill pipe, a jar coupled to the drill pipe and having a mandrel that is slidingly received within a sleeve, and a reaction valve coupled between the drill pipe and the jar, the reaction valve being operable to throttle the flow of drilling fluid; an arrangement disposed at a surface of the earth carrying the drill string and operable to rotate the drill string; and a control system operatively coupled to the reaction valve so as to selectively throttle the flow of drilling fluid; whereby throttling the flow of drilling fluid creates a differential pressure across the reaction valve and an axial force that is transferred to the jar so as to urge the mandrel to move with respect to the sleeve. Embodiments of the assembly for connection to a drill pipe may generally have: A reaction valve arranged for fluid coupling to the drill pipe and to throttle the flow of drilling fluid; a jar coupled to the reaction valve, the jar having a mandrel that is slidingly received within a sleeve; and a control system operatively coupled to the reaction valve so as to selectively throttle the flow of drilling fluid; whereby throttling the flow of drilling fluid creates a differential pressure across the reaction valve and an axial force that is transferred to the jar so as to urge the mandrel to move with respect to the sleeve. Embodiments of the method of drilling a wellbore may generally include: Providing a drill string that includes a drill pipe, a jar, and a reaction valve disposed between the drill pipe and the jar, the jar including a mandrel that is slidingly received within a sleeve; providing a flow of drilling fluid through the drill pipe and the reaction valve; and selectively throttling the flow by the reaction valve so as to create a differential pressure across the reaction valve, the differential pressure creating an axial force that is transferred to the jar so as to urge the mandrel to move with respect to the sleeve.

Any of the foregoing embodiments may include any one of the following elements or characteristics, alone or in combination with each other: The reaction valve is disposed above the jar; selectively throttling the flow in a downward direction so as to create a compressive set-down force that is transferred to the jar; selectively throttling the flow in an upward direction so as to create a tensile force that is transferred to the jar; the force that is transferred to the jar aids in cocking the jar; the force that is transferred to the jar aids in firing the jar; bypassing the flow downstream of the reaction valve from the drill string to a wellbore annulus; the drill pipe includes an inner pipe disposed within an outer pipe; bypassing the flow in a downward direction in the outer pipe to an upward direction in the inner pipe; the reaction valve is coupled to the drill pipe so as to throttle the flow in a downward direction so as to create a compressive set-down force that is transferred to the jar; the reaction valve is coupled to the drill pipe so as to throttle the flow in an upward direction so as to create a tensile force that is transferred to the jar; the force that is transferred to the jar aids in cocking the jar; the force that is transferred to the jar aids in firing the jar; a bypass valve coupled to the reaction valve and operable to bypass the flow downstream of the reaction valve from the drill string to a wellbore annulus; and a bypass valve coupled to the reaction valve and operable to bypass the flow in a downward direction in the outer pipe to an upward direction in the inner pipe.

The Abstract of the disclosure is solely for providing the a way by which to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed:

1. A method for drilling a wellbore, comprising:
   providing a drill string that includes a drill pipe, a jar, a reaction valve disposed between said drill pipe and said jar, and a bypass valve coupled between said reaction valve and said jar, said jar including a mandrel that is slidingly received within a sleeve, and said bypass valve operable to direct fluid flow from said drill string to a wellbore annulus;
   flowing drilling fluid through said drill pipe and said reaction valve; and
   selectively throttling said drilling fluid by said reaction valve so as to create a differential pressure across said reaction valve to impart an axial force to said jar so as to urge said mandrel to move with respect to said sleeve.

2. The method of claim 1 further comprising:
positioning said reaction valve above said jar.

3. The method of claim 1 further comprising:
selectively throttling said drilling fluid in a downward direction so as to create a compressive set-down force that is transferred to said jar.

4. The method of claim 1 further comprising:
selectively throttling said drilling fluid to facilitate cocking said jar.

5. The method of claim 1 further comprising:
selectively throttling said drilling fluid to facilitate firing said jar.

6. The method of claim 1 further comprising:
bypassing said flow downstream of said reaction valve from said drill string to a wellbore annulus above a blockage in said annulus.

7. A drilling system comprising:
a drill string disposed in a wellbore, said drill string including a drill pipe, a jar coupled to said drill pipe and having a mandrel that is slidingly received within a sleeve, a reaction valve coupled between said drill pipe and said jar, and a bypass valve coupled between said reaction valve and said jar, said reaction valve movable between an open position and a throttled position, and said bypass valve operable to bypass fluid flow downstream from said of said reaction valve from said drill string to a wellbore annulus;
a drilling rig carrying said drill string and operable to rotate said drill string; and
a control system operatively coupled to said reaction valve so as to selectively position said reaction valve; whereby
throttling a flow of drilling fluid across said reaction valve creates a differential pressure and an axial force that is transferred to said jar so as to urge said mandrel to move with respect to said sleeve.

8. The system of claim 7 further comprising:
said reaction valve disposed above said jar.

9. The system of claim 7 further comprising:
said reaction valve coupled to said drill pipe so as to throttle said flow in a downward direction and impart a compressive set-down force to said jar.

10. The system of claim 7 wherein:
said force that is transferred to said jar aids in cocking said jar.

11. The system of claim 7 wherein:
said force that is transferred to said jar aids in firing said jar.

12. A jar assembly for connection to a drill pipe, said drill pipe forming a conduit for a flow of drilling fluid, the jar assembly comprising:
a reaction valve;
a jar coupled to said reaction valve, said jar having a mandrel that is slidingly received within a sleeve;
a bypass valve coupled between said reaction valve and said jar, said bypass valve operable to bypass said flow downstream of said reaction valve from said drill string to a wellbore annulus; and
a control system operatively coupled to said reaction valve so as to selectively throttle said flow of drilling fluid across said reaction valve; whereby
throttling said flow of drilling fluid across said reaction valve creates a differential pressure and an axial force that is transferred to said jar so as to urge said mandrel to move with respect to said sleeve.

13. The assembly of claim 12 further comprising:
said reaction valve disposed above said jar.

14. The assembly of claim 12 further comprising:
said reaction valve coupled to said drill pipe so as to throttle said flow in a downward direction and impart a compressive set-down force to said jar.

15. The assembly of claim 12 wherein
said force that is transferred to said jar aids in cocking said jar.

16. The assembly of claim 12 wherein
said force that is transferred to said jar aids in firing said jar.

* * * * *